(No Model.)
J. A. PEER.
DEVICE FOR SHARPENING KNIVES AND ANALOGOUS ARTICLES.
No. 466,293. Patented Dec. 29, 1891.
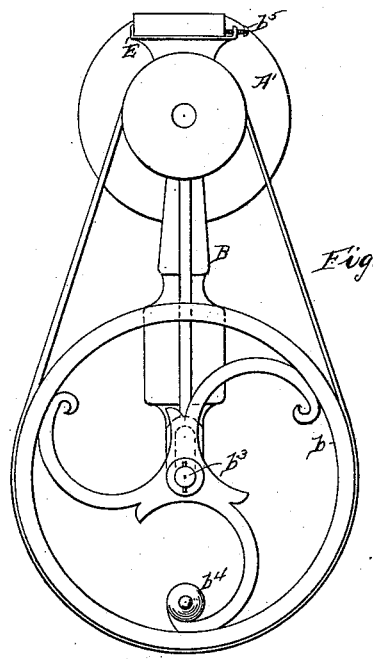
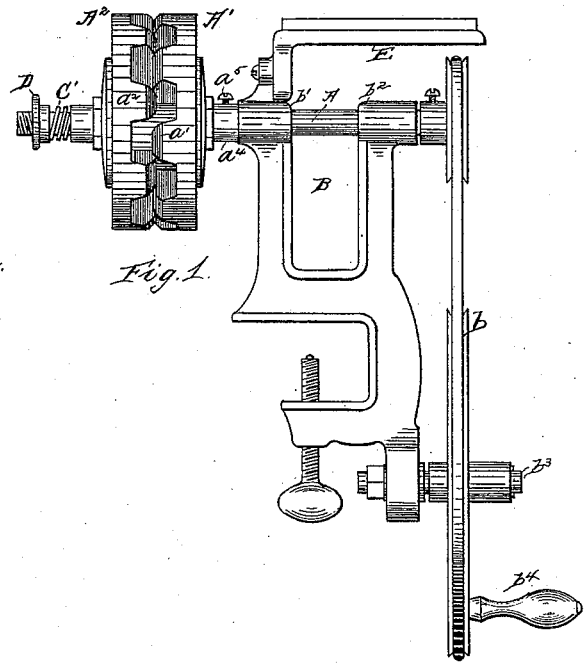
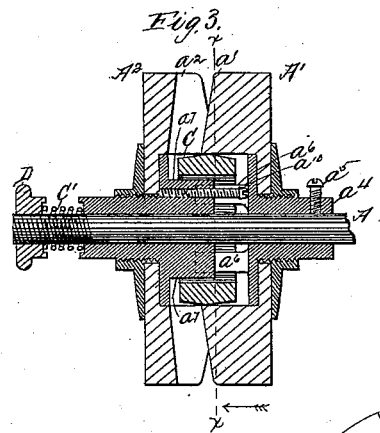
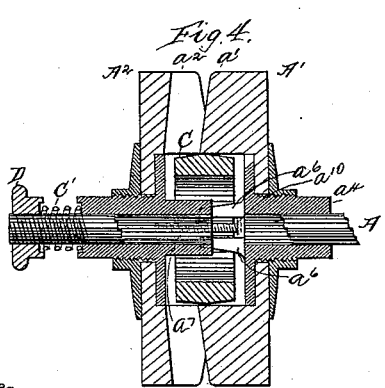
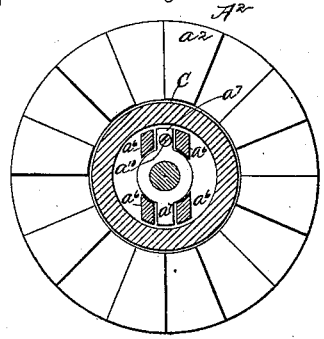
WITNESSES:
INVENTOR

UNITED STATES PATENT OFFICE.

JOHN A. PEER, OF BROOKLYN, NEW YORK, ASSIGNOR TO THE PEER MANUFACTURING COMPANY, OF SAME PLACE.

DEVICE FOR SHARPENING KNIVES AND ANALOGOUS ARTICLES.

SPECIFICATION forming part of Letters Patent No. 466,293, dated December 29, 1891.

Application filed December 22, 1890. Serial No. 375,541. (No model.)

*To all whom it may concern:*

Be it known that I, JOHN A. PEER, of Brooklyn, Kings county, and State of New York, have invented a new and useful Improvement in Devices for Sharpening Knives and Analogous Articles, of which the following is a specification.

I will describe a sharpening device embodying my improvement, and then point out the novel features in the claims.

In the accompanying drawings, Figure 1 is a side view of a device embodying my improvement. Fig. 2 is an end view thereof. Fig. 3 is a section taken diametrically through two disks which are comprised in the machine. Fig. 4 is a view like Fig. 3, but the plane of the section is at right angles to that of Fig. 3.

Similar letters of reference designate corresponding parts in all the figures.

$A'$ $A^2$ designate two disks or carriers arranged adjacent to each other on a rotary shaft A. This shaft is journaled in bearings $b'$ $b^2$, formed in a frame B, which may be made of any suitable construction; but is here shown as constructed so as to be capable of being clamped to the edge of a table or like device. On one end of the shaft A is affixed a pulley that receives a belt passing around a driving-pulley $b$, rotating upon a stud $b^3$, extending from the lower part of the frame B. The pulley $b$ is provided with a crank $b^4$, whereby it may be rotated for the purpose of rapidly rotating the shaft A and its disks $A'$ $A^2$.

The disks $A'$ $A^2$ are made of a composition comprising emery and have projections $a'$ $a^2$ on their opposite surfaces. These projections are shown as made in the form of radial ribs having their faces inclined toward the shaft, and the projections of each disk are opposite the spaces between those of the other disk. The disks are so arranged with relation to each other that the inclined faces of the projections of each disk will cross the faces of the projections of the other disk. Owing to this an inwardly-tapering recess is formed between the opposite faces of the disks for the reception of a knife or analogous article. The disk $A'$ is fixed to the shaft; but the disk $A^2$ has a sliding connection therewith. Because of this a knife or analogous article may be forced down between the operative faces of the disks to any desired extent which will be desirable to enable it to be sharpened.

The disk $A'$ has a hub $a^4$, which fits the shaft A, and is fastened thereon by means of a set-screw $a^5$. This hub is formed integral with a metal piece upon which the disk $A'$ is mounted. This metal piece comprises pairs of jaws $a^6$, that extend toward the other disk $A^2$.

The disk $A^2$ is mounted upon a metal piece, which is in general construction similar to the metal piece upon which the disk $A'$ is mounted; but it is loose on the shaft A. It has ribs $a^7$, which fit between the pairs of jaws $a^6$. The engagement of the ribs $a^7$ with the jaws $a^6$ insure the rotation of the disk $A^2$ with the disk $A'$ and the shaft A. The ends of the jaws $a^6$ form stops which limit the movement of the disk $A^2$ toward the disk $A'$. One may be provided at its end with a screw $a^{10}$, and such a screw will form an adjustable stop, whereby adjustments in the relation of the disks to compensate for wear can be made. A wooden collar C surrounds the jaws $a^6$ and ribs $a^7$ to prevent the edge of a knife from reaching them and thereby sustaining injury.

The disk $A^2$ is moved toward the disk $A'$ by means of a helical spring $C'$, that is coiled around the shaft A between the hub of the disk $A^2$ and a nut D, that is fitted to a screw-threaded portion at the end of said shaft. By adjusting the nut the tension of the spring may of course be varied. On the insertion of a knife or like article between the disks the disk $A^2$ may be moved away from the disk $A'$ against the resistance of the spring.

A hone-holder E may be fastened to a bracket extending from the frame B. It is shown as made in the form of a trough provided with screws $b^5$, whereby a hone may be clamped in it.

What I claim as my invention, and desire to secure by Letters Patent, is—

1. In a sharpener for knives and like articles, the combination of two rotary disks provided on their opposite sides with projections having inclined faces and arranged so that those on one disk will be opposite the spaces between those of the other disk, jaws extending from one disk, ribs extending from the other disk and engaging with the jaws, a rotary shaft supporting the disk, means for securing one of the disks to the rotary shaft, and a spring for moving the other disk toward that disk which is fixed to the shaft, substantially as specified.

2. In a sharpener for knives and like articles, the combination of a rotary shaft, disks or carriers mounted on said shaft to rotate therewith and provided on their opposite faces with radial projections having the front faces inclined toward the outer edge of the disks or carriers and so disposed that the projections of each disk or carrier are opposite the spaces between the projections of the other disk or carrier, one of said disks or carriers being mounted on said shaft so as to have a yielding movement lengthwise thereof, substantially as specified.

3. In a sharpener for knives and like articles, the combination of two disks, one of which is adjustable relatively to the other and an adjustable stop consisting of a screw engaging in a portion of one of the disks, substantially as specified.

4. In a sharpener for knives and like articles, the combination of opposite disks having interlocking jaws and ribs and a wooden collar between the sharpening-surfaces of the disks and the jaws and ribs, substantially as specified.

In testimony whereof I have signed my name to this specification in the presence of two subscribing witnesses.

JOHN A. PEER.

Witnesses:
S. O. EDMONDS,
WM. C. POWERS.